(12) United States Patent
Makkun

(10) Patent No.: US 6,462,444 B1
(45) Date of Patent: Oct. 8, 2002

(54) POWER APPARATUS WITH LOW ENERGY CONSUMPTION

(76) Inventor: Panpop Makkun, 89/42 Moo 10, Omnoi, Kratoomban District, Samutsakorn (TH)

( * ) Notice: Subject to any disclaimer, the term of this patent is extended or adjusted under 35 U.S.C. 154(b) by 0 days.

(21) Appl. No.: 09/625,876

(22) Filed: Jul. 26, 2000

(30) Foreign Application Priority Data

Jul. 30, 1999 (IT) .......................................... GE99A0089

(51) Int. Cl.$^7$ .............................. F03G 1/00; H02K 7/00
(52) U.S. Cl. ..................... 310/75 A; 310/66; 310/68 R; 310/74; 310/112; 185/40 R; 322/4
(58) Field of Search ................... 310/75 A, 10, 310/40 R, 46, 66, 68 R, 74, 112; 60/698; 185/39, 40 R, 40 A, 40 B, 40 K, 37; 322/4

(56) References Cited

U.S. PATENT DOCUMENTS

| | | | | |
|---|---|---|---|---|
| 1,481,279 A | * | 1/1924 | Zippel | 185/11 |
| 1,501,677 A | * | 9/1924 | Mahon | 396/412 |
| 3,724,200 A | | 3/1973 | Donner | 58/41 |
| 4,020,923 A | * | 5/1977 | Taylor | 185/11 |
| 4,371,058 A | * | 2/1983 | Holley | 185/11 |
| 4,953,850 A | * | 9/1990 | Lo | 482/59 |
| 5,197,045 A | | 3/1993 | Miyazawa | 368/157 |

FOREIGN PATENT DOCUMENTS

| | | |
|---|---|---|
| DE | 4322058 | 2/1994 |
| FR | 6935395 | 8/1971 |
| GB | 2060815 | 5/1981 |
| JP | 06254068 | 8/1994 |

OTHER PUBLICATIONS

Patent Abstract of Japan 06254068, Aug. 1994.

* cited by examiner

Primary Examiner—Burton S. Mullins
(74) Attorney, Agent, or Firm—Ladas & Parry

(57) ABSTRACT

A power apparatus in which a battery is connected to a dynamo to drive it as a motor and deliver energy to a spiral spring to wind-up the spring. When the spring has been wound to a particular degree a sensor disconnects the motor from the spring which now unwinds and delivers output power. A further sensor detects low charge state of the battery and during unwinding of the spring, some spring energy is delivered to the dynamo, now acting as an alternator, to charge the battery.

18 Claims, 2 Drawing Sheets

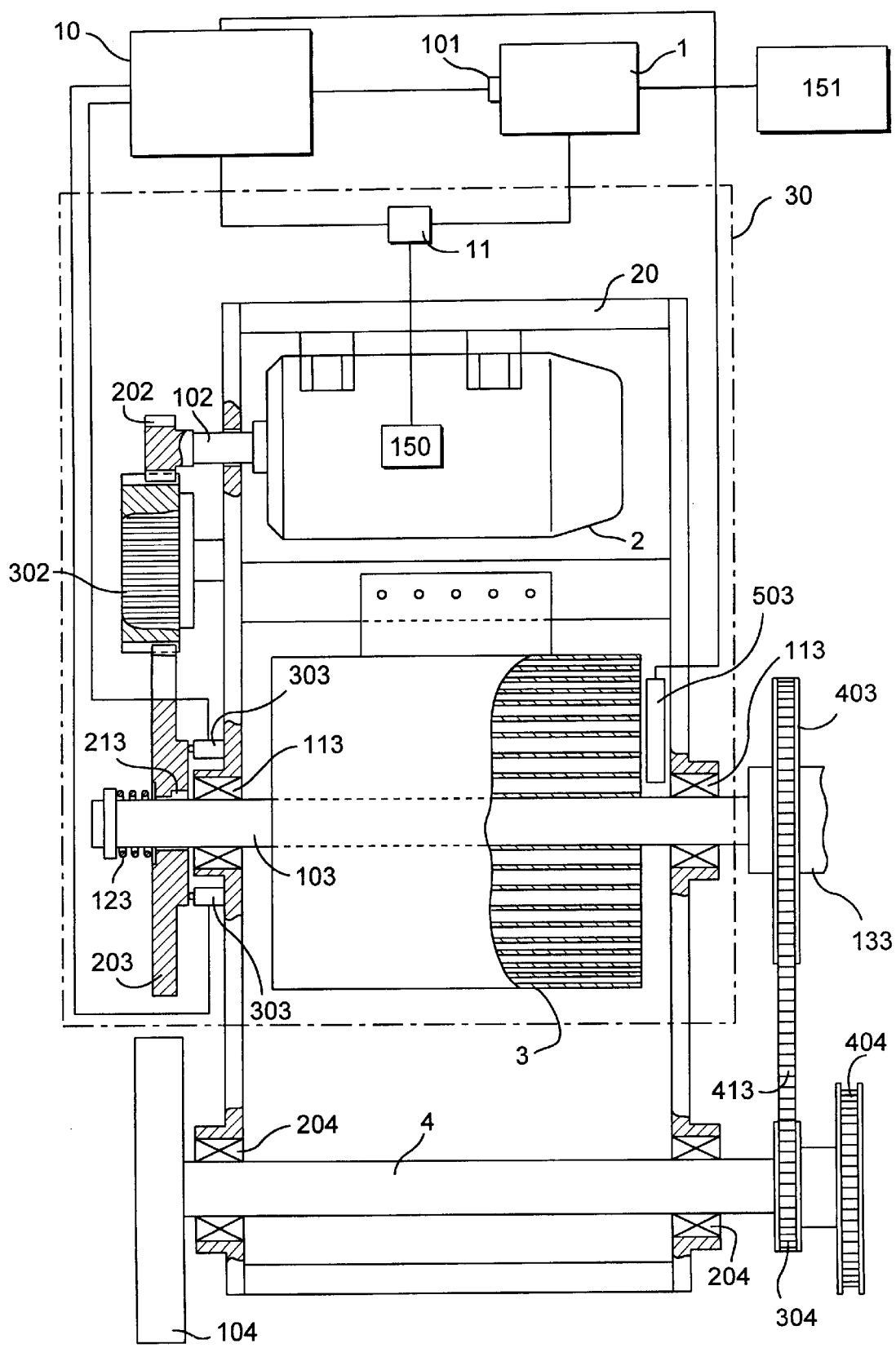
F I G. 1

POWER APPARATUS WITH LOW ENERGY CONSUMPTION

BACKGROUND OF THE INVENTION

1. Field of the Invention

The present invention has for its object a power apparatus, and particularly relates to a power apparatus presenting a low energy consumption.

2. Description of the Related Art

Generally, with limited variations in efficiencies, the power delivered by a power apparatus is substantially proportional to the quantity of energy consumed in order to develop the said power. Normally this means that in order to obtain relevant performance it is necessary to develop high energy consumption. One type of solution to this problem takes into consideration the control of the efficiency; however in this case optimization cannot be carried beyond predetermined threshold values.

It has been accepted for centuries that different types of springs can be efficiently used as the components of machinery in many ways. Spiral springs are used to distribute mechanical power for various equipment such as antique clocks and toys. In every cycle of recharging, after the spiral spring has discharged the mechanical power out, the operation of the equipment is interrupted. The supply of mechanical power will not be continuous because the shaft of the spiral spring rotates in opposite directions during the processes of charging and discharging.

SUMMARY OF THE INVENTION

The scope of the present invention is to provide a power apparatus in which, in spite of extremely limited consumption, the developed power is surprisingly high.

BRIEF DESCRIPTION OF THE DRAWINGS

FIG. 1 is a diagrammatic elevation view, with parts in section, of the power apparatus according to the invention.

DETAILED DESCRIPTION OF THE DRAWINGS

Figure 3:
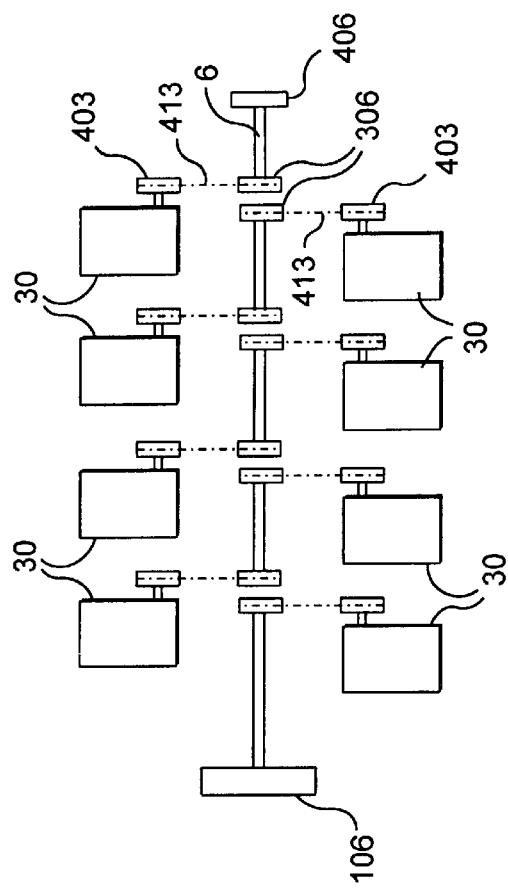
FIGS. 2 to 4 diagrammatically show various embodiments of the power apparatus shown in FIG. 1.

The present invention is a power apparatus which comprises:

means for generating and storing potential energy;

at least one group comprising means for the transformation of the potential energy into kinetic energy, and particularly into mechanical energy and means for the storage of the mechanical energy into potential mechanical energy;

said group being coupled with means for dispensing the said mechanical energy, in combination with an inertial mass.

According to a preferred embodiment, the said means for generating and storing energy comprise an accumulator of electric energy, and more particularly an electric battery; the means for the transformation of the potential energy into mechanical energy may comprise an electric motor.

The means for storing the mechanical energy preferably comprises a spiral spring.

Further advantages and features of the apparatus according to the present invention will appear evident from the following description of a preferred embodiment given by way of non-limiting example, with reference to the attached drawings.

In FIG. 1 there is shown the power apparatus according to the present invention; reference numeral 1 designates the accumulator battery which feeds the group 30 for transformation and storage of energy, identified by the dash-and-dot box, through a switch 10, actuated by a control unit 10. The battery is provided with means 101 for measuring and sensing the condition of charge of the battery itself, said means being also connected to the control unit 10. The motor 2 is connected to the frame 20 and is provided with a shaft 102 onto which there is keyed toothed wheel 202; the said toothed wheel is coupled, through the idle toothed wheel 302, to the toothed wheel 203, mounted on the shaft 103 which carries the spiral spring 3. The toothed wheel 203 is coupled to the shaft 103 by means of a key 213; pushing means 303 is provided on frame 20, facing the side of the wheel 203 directed towards the spring 3, and is controlled by the control unit 10. In addition, on the opposite side of the toothed wheel 203 there is provided pressure means, such as for example a helical spring 123. The shaft 103 rotates on bearings 113. The other end of the shaft 103 is coupled, through the freewheel mechanism 133 to the pulley 403, which, through the toothed belt 413 transmits the drive to the shaft 4, rotatably mounted on the frame 20 by means of the bearings 204, by means of the pulley 304 keyed thereon; at the same end of the shaft 4 there is arranged the power takeoff 404, intended to be connected to the system for the utilization of the drive of shaft 4, while at the opposite end there is keyed the flywheel 104.

Figure 2:
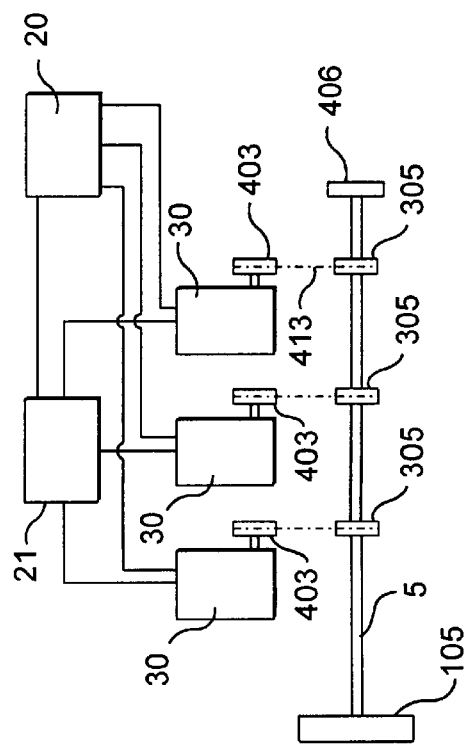
Figure 4:
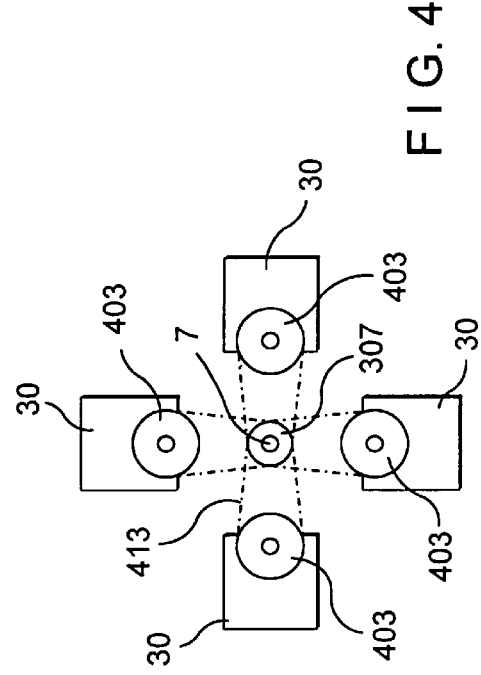

In the FIGS. 2, 3 and 4 there are diagrammatically illustrated different combinations obtained by utilizing the apparatus of the type disclosed in FIG. 1. As it can be appreciated, the groups 30 can be arranged in line with respect to a shaft 5, provided with a flywheel 105 and be coupled, through the respective pulleys 403, with the pulleys 305 keyed on shaft 5. All the groups are fed by battery 21 and connected to the control unit 20. In a similar matter, the arrangement of the groups 30 can be of the V-type, with a shaft 6 which is provided with pulleys 306 keyed thereon, as shown in FIG. 3; alternatively, the configuration can be of the star-type with a shaft 7 around which the groups 30 are peripherally equally spaced as shown in FIG. 4.

The operation of the power apparatus according to the invention will now be described. Through the control unit 10 the switch 11 is actuated and therefore the electric motor 2 is started. The motor transmits its drive through the shaft 102, the wheel 202, and the idle wheel 302, to the toothed wheel 203 coupled to the shaft 103 onto which there is wound the spiral spring 3. The sensor 503 connected to the control unit 10 senses the state of charge (wind-up) of the spring, so that upon reaching a predetermined level of charge, the toothed wheel 203 is disconnected from the shaft 103 under the action of the pushing means 303, controlled by the control unit 10.

At this stage, the spring unwinds itself, thus producing the rotation of shaft 103 in a direction opposite to the direction of charging, and in this situation the freewheel mechanism 133 onto which there is keyed pulley 403 is actuated, thus permitting the transmission of motion to the shaft 4, through the chain 403 and the pulley 304. The flywheel 104 has the function of normalizing the speed of rotation of the shaft and of rendering the motion continuous, which otherwise would be pulsating, due to the phases of charge and discharge of the spring 3.

Subsequently, the sensor 503 signals to the unit 10 that the spring has reached its minimum level of charge, which can be suitably predetermined, and consequently the control unit 10 disconnects the pushers 303, thus permitting the pressure member 123 to act on wheel 203 so as to again establish the coupling between this latter and the shaft 103. Advantageously, if the means 101 for sensing the level of charge of battery 1 indicates a decrease beyond a certain level, the toothed wheel 203 can be coupled to shaft 103 also during the discharge phase of the spring, in which case a portion of the drive by the unwinding spring will be utilized for re-charging the battery 1; in this case the electric motor 2 must operate as a dynamo and be capable of working under conditions of reversibility, as a motor in one direction (winding the spring) or an alternator in the opposite direction (unwinding of the spring). When acting as the alternator, the dynamo is connected to the battery by a rectifier 150.

As it appears in FIGS. 2 to 4, the power apparatus of the invention can be assembled according to different combinations. Several groups, indicated by reference numeral 30 can be connected to the same shaft according to different configurations. The time periods of charge and discharge of the springs of each group can be organized in such a manner as to reduce the pulsation in the motion of the shaft. For each configuration there can be provided a single feed battery 21 and a single central control unit 20, capable of controlling all the groups.

The power apparatus according to the present invention is therefore constructed so as to be capable of supplying substantial power starting from moderate energies, thanks to its particular system of storage of the mechanical energy. Another embodiment of the invention includes the addition of a solar cell 151 to transform solar energy to electric energy to be stored in the generating and storing means thus achieving even higher efficiency of the power apparatus.

What is claimed is:

1. A power apparatus comprising:
    electrical storing means for storing electrical energy;
    at least one unit for transformation and storage of energy comprising electromechanical means for transformation of said electrical energy from the electrical storing means into mechanical energy and for transforming mechanical energy into electrical energy, and
    spring means for storage of the mechanical energy as potential mechanical energy, said at least one unit being coupled with mechanical means for delivering said mechanical energy, said mechanical means including an inertia mass, said electromechanical means being constructed and arranged to deliver the mechanical energy to said spring means for delivery to said mechanical means and for receiving output from said spring means to supply electrical energy to said electrical storing means.

2. A power apparatus according to claim 1, in which said means for storing electrical energy comprises an electric battery.

3. A power apparatus according to claim 2, in which said electromechanical means comprises an electric dynamo.

4. A power apparatus according to claim 3, in which said electric dynamo is operative as a motor and an alternator, said dynamo being connected to said battery to charge said battery when operating as an alternator.

5. A power apparatus according to claim 4, in which said spring means comprises a spiral spring.

6. A power apparatus according to claim 5, in which said spiral spring is wound on a spring shaft coupled through a transmission means to the dynamo.

7. A power apparatus according to claim 6, in which said transmission means comprises a toothed wheel releasably coupled on said spring shaft and disconnecting means for disconnection of the spring shaft and the dynamo.

8. A power apparatus according to claims 7, in which said spring shaft has one end coupled to said dynamo and an opposite end, carrying a freewheel mechanism or ratchet gear, coupled through a chain to a ratchet gear keyed on the output shaft carrying the power takeoff.

9. A power apparatus according to claim 8, comprising a central control unit connected to switch means for establishing connection of the dynamo with the battery, with said disconnecting means for uncoupling the toothed wheel on the spring shaft, with a sensor for sensing a winding condition of the spring and with a sensor for sensing electric charge of said battery.

10. A power apparatus according to claim 1, in which said mechanical means for delivering the mechanical energy comprises an output shaft connected to said spring means and a power takeoff on said output shaft, said inertia mass comprising a heavy flywheel on said output shaft.

11. A power apparatus according to claim 10, wherein a plurality of said at least one unit are provided for the transformation and storage of energy, said plurality of said at least one unit being coupled to the output shaft and arranged in a line configuration, a V configuration or a star configuration relative to said output shaft.

12. A power apparatus according to claim 1, comprising a control unit for controlling operation of the apparatus.

13. A power apparatus according to claim 1, further comprising a solar cell to transform solar energy into electricity to charge the battery.

14. Apparatus for delivering power comprising
    a rechargeable battery,
    a control unit connected to said battery,
    a power unit connected to said control unit for delivering power output from said battery, said power unit comprising a dynamo operative as a motor and as an alternator,
    a switch connected between said control unit and said dynamo such that in one state the battery drives the dynamo as the motor while in a second state the dynamo acts as the alternator and charges the battery,
    a spring connected on a spring shaft, said spring in said one state storing mechanical energy delivered from said dynamo acting as the motor while in said second state the spring releases stored energy,
    an output shaft for delivering output power from said power unit,
    a gear transmission including a ratchet gear connecting said spring shaft and said output shaft so that in said second state said spring delivers mechanical energy to said output shaft while in said one state said spring receives said mechanical energy and free-wheels with respect to said output shaft,
    a transmission assembly between said spring and said dynamo for delivering said mechanical energy from said dynamo to said spring so that said spring operates in said one state to store the mechanical energy, said transmission assembly including a release mechanism connected to said control unit to interrupt delivery of mechanical energy from the dynamo to the spring in the second state thereof,
    a sensor connected to said battery to detect a charge state thereof, said sensor being connected to said control unit so that when a low charge state is detected in said battery, said transmission assembly is operated to drivingly connect said spring, when in said second state thereof, to said dynamo so that the dynamo is driven as the alterator to produce electrical energy which is supplied via said switch to charge said battery.

15. The apparatus of claim 14, wherein said transmission assembly includes a gear transmission between the dynamo and the spring shaft, said gear transmission including a slidable gear selectively connecting the dynamo and the spring shaft, a pusher connected to said control unit to push the slidable gear to disconnect the dynamo and the spring shaft when the spring delivers output power to said output shaft, and a further spring acting on said slidable gear to connect the dynamo to the spring shaft.

16. The apparatus of claim 15, wherein said spring on the spring shaft comprises a spiral spring which is wound up in said one state and unwound in said second state.

17. The apparatus of claim 16, wherein due to said ratchet wheel said output shaft rotates in one direction only, a flywheel being provided on said output shaft.

18. Power apparatus comprising a rechargeable battery a dynamo connected to said battery a spring connected to said dynamo to store energy delivered to the spring from the dynamo acting as a motor sensor means for sensing energy storage of the spring and to release the stored energy a transmission between the dynamo and the spring to disconnect the spring and the dynamo when the stored energy is released from the spring, a further sensor means for sensing a charge state of the battery to keep the transmission connected to the dynamo when the stored energy is released so that a portion of the stored energy is delivered to the dynamo which now acts as an alternator to charge the battery.

* * * * *